United States Patent [19]

Ohlinger et al.

[11] Patent Number: 4,497,723

[45] Date of Patent: Feb. 5, 1985

[54] PREPARATION OF ACICULAR, FERRIMAGNETIC IRON OXIDES

[75] Inventors: Manfred Ohlinger, Frankenthal; Guenter Vaeth, Limburgerhof; Peter Rudolf, Neuhofen; Wilhelm Sarnecki, Limburgerhof; Helmut Jakusch; Eberhard Koester, both of Frankenthal; Milena Melzer, Ludwigshafen, all of Fed. Rep. of Germany

[73] Assignee: BASF Aktiengesellschaft, Fed. Rep. of Germany

[21] Appl. No.: 508,168

[22] Filed: Jun. 27, 1983

[30] Foreign Application Priority Data

Jun. 30, 1982 [DE] Fed. Rep. of Germany ....... 3224325

[51] Int. Cl.³ .................. C01G 49/06; C01G 49/08
[52] U.S. Cl. .................. 252/62.56; 423/632; 423/634
[58] Field of Search ............ 252/62.56; 423/632, 423/634

[56] References Cited

U.S. PATENT DOCUMENTS 2,900,236 8/1959 Speed et al. .
3,382,174 5/1968 Hund .
3,399,142 8/1968 Conley .
3,498,748 3/1970 Greiner .
3,904,540 9/1975 Bennetch et al. .
4,018,882 4/1977 Koester et al. .................. 423/634
4,059,716 11/1977 Kopke et al. .
4,071,610 1/1978 Koester et al. .................. 423/634
4,137,342 1/1979 Kanten ...................... 252/62.56 X
4,176,172 11/1979 Bennetch et al. .............. 423/634
4,213,959 7/1980 Brodt et al. ................. 252/62.56 X

FOREIGN PATENT DOCUMENTS 675260 7/1952 United Kingdom .

*Primary Examiner*—Jack Cooper
*Attorney, Agent, or Firm*—Keil & Weinkauf

[57] ABSTRACT

A process for the preparation of acicular ferrimagnetic iron oxides by reducing gamma-iron(III) oxide hydroxide to magnetite, at from 280° to 620° C., by means of an organic compound which is decomposable at this temperature in the presence of iron oxide, and, optionally, a stream of reducing gas, and, if desired, then oxidizing the magnetite with oxygen-containing gases, at from 150° to 450° C., to acicular ferrimagnetic iron oxide of the formula $FeO_x$, where x is from above 1.33 to 1.50, wherein the organic compound used for the reduction is a non-polar glycerol ester of a fatty acid which is introduced into the aqueous reaction suspension during the preparation of the gamma-iron(III) oxide hydroxide.

2 Claims, 1 Drawing Figure

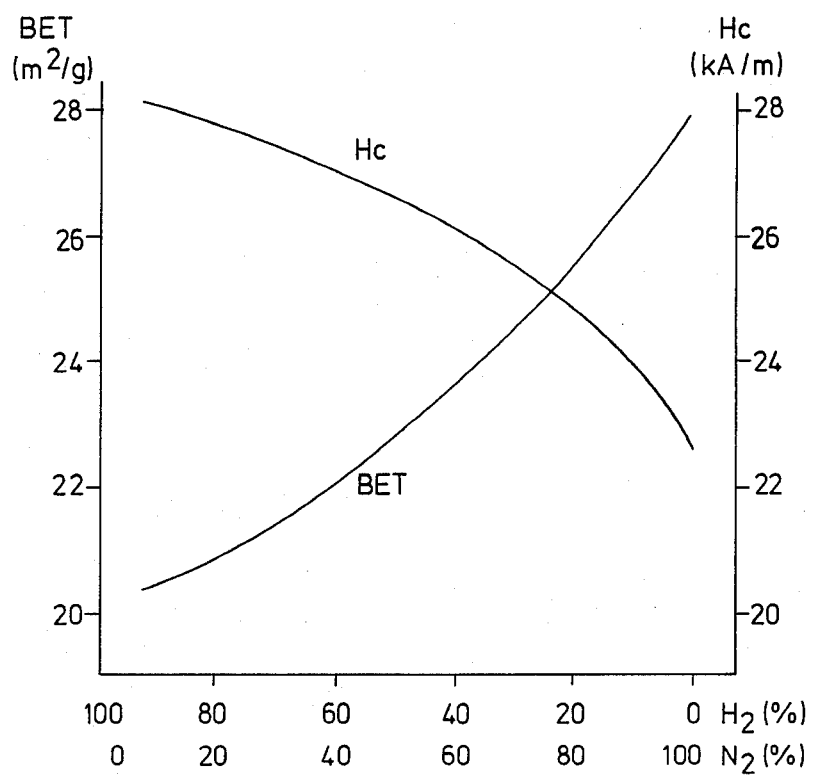

PREPARATION OF ACICULAR, FERRIMAGNETIC IRON OXIDES

The present invention relates to a process for the preparation of acicular ferrimagnetic iron oxides by reducing gamma-iron(III) oxide hydroxide to magnetite, at from 280° to 620° C., by means of an organic compound which is decomposable at this temperature in the presence of iron oxide, and, if desired, then oxidizing the magnetite with oxygen-containing gases, at from 150° to 450° C., to acicular ferrimagnetic iron oxide of the formula $FeO_x$, where x is from above 1.33 to 1.50.

Acicular ferrimagnetic iron oxides have long been employed extensively as magnetizable materials in the manufacture of magnetic recording media. Many processes for the preparation of the principally used compound gamma-iron(III) oxide have been disclosed. For example, as early a publication as British Pat. No. 675,260 describes a process for obtaining gamma-iron(III) oxide, wherein acicular $\alpha$-iron oxide hydroxide (goethite) is dehydrated to $\alpha$-iron(III) oxide, the latter is converted to magnetite in a reducing atmosphere at above 300° C., and the magnetite is oxidized to acicular gamma-iron(III) oxide in air at below 450° C. In the course of efforts to improve the crystalline, mechanical and magnetic properties of such materials, this process has undergone several modifications with respect to its individual stages and starting materials used.

It has also been disclosed that ferrimagnetic iron oxides can be prepared by heating an iron oxide hydroxide with an organic substance. In this process, the organic substance is decomposed and the iron oxide hydroxide is reduced to magnetite, which can then either itself be used as the magnetic pigment or be converted into $\alpha$-iron(III) oxide in the manner described. In as early a process as that disclosed in German Pat. No. 801,352, non-magnetic iron oxides are converted into magnetite by treatment with salts of short-chain carboxylic acids, followed by heating. According to U.S. Pat. No. 2,900,236, $\alpha$-Fe$_2$O$_3$ or $\alpha$-FeOOH can be reduced using any organic substance which decomposes at below 540° C. and produces little ash and tar. A number of subsequent publications described the reduction of $\alpha$-iron oxides with organic substances, for example with higher hydrocarbons, alcohols, amines, fatty acids or their salts, oils, fats or waxes (German Laid-Open Application DOS No. 2,064,804, East German Pat. No. 91,017 and German Published Applications DAS No. 1,203,656 and DAS 1,771,327). The reduction of $\gamma$-FeOOH with coconut oil fatty acid has also been described (German Published Application DAS No. 2,212,435). The essential feature of these processes is thorough mixing of the organic compound with the iron oxide hydroxide, or application of a very thin layer of the organic compound to the oxide. For this purpose, for example according to German Laid-Open Application DOS No. 2,064,804, the iron oxide used is impregnated with a liquid organic compound, and excess organic compound is removed. Solid organic substances are dissolved in a solvent, and the solution is brought into contact with the iron oxide. Coating methods have also been described in which an organic compound which is water-soluble or has been rendered water-soluble is added to an aqueous dispersion of the iron oxide hydroxide. Thus, according to German Published Application DAS No. 1,203,656, a water-insoluble soap is precipitated onto the iron oxide from a suspension of the latter in a solution of a water-soluble soap by the addition of an appropriate cation. As described in German Published Applications DAS No. 1,771,327 and DAS No. 2,212,435, an aqueous suspension of the iron oxide can be treated with a water-soluble soap based on a monocarboxylic acid, and the fatty acid can then be precipitated by acidification. In another possible method, a suitable acid is employed which is rendered water-soluble by the addition of morpholine. It is also necessary to ensure intimate mixing by using particularly effective mixers or by increasing the temperature. An $\alpha$-iron oxide or $\alpha$-iron oxide hydroxide in aqueous dispersion can also be coated with an organic compound having a betaine structure (German Published Application DAS No. 2,428,875), with an alkylphenol (German Published Application DAS No. 2,447,386) or with a water-soluble compound of the formula $R^1R^2R^3)P=O$ (German Laid-Open Application DOS No. 2,520,643). The addition of a water-soluble soap at as early a stage as the preparation of the iron oxide hydroxide has also been disclosed (East German Pat. No. 91,017). In an alkaline medium, it is also possible to use the long-chain fatty acid itself, this being converted to the soap by the alkali. However, as described in East German Pat. No. 74,306, these soaps also affect the geometry of the resulting iron oxide hydroxide, and are therefore employed, in addition to other surfactants, for example for controlling the length/width ratio. For this purpose, it is also possible to employ water-soluble macromolecular substances which act as protective colloids, eg. dextran, polyvinyl alcohol, etc. The length/width ratio of the resulting iron oxide hydroxide crystals decreases sharply with increasing concentration of the surfactants or of the protective colloids in the reaction solution. In accordance with German Laid-Open Application DOS. No. 2,461,937, carboxyl-containing polymers are added during the synthesis of $\alpha$-FeOOH in order to produce magnetic pigments which give magnetic tapes having a particularly high signal-to-noise ratio. In order to be suitable for use in the process, these polymers must possess free carboxyl groups, and hence have an acid number of not less than 50. All of the compounds mentioned therefore possess both a hydrophilic and a hydrophobic component, and hence are at least somewhat water-soluble; they are polar and are surfactants or protective colloids. A disadvantage of such compounds is that they are often capable of existing only in certain pH ranges; for example, the soaps can exist only in the alkaline range. Furthermore, to completely dissolve these compounds in water, relatively high temperatures or assistants are often required. Many of these compounds contain heteroatoms, eg. S, P or N, which then remain, as inorganic radicals, on the pigment particles during further conversion of the iron oxide hydroxide and even after conversion to $\gamma$-Fe$_2$O$_3$. In some cases, this may be desirable for shape retention, but in general these non-magnetic constituents have an adverse effect on the magnetic properties and make it more difficult to incorporate the magnetic material into the film-forming organic polymers. Another disadvantage of the processes described is that the said substances are applied to ready-prepared, or isolated and washed, iron oxide hydroxides. In spite of good dispersing, it is not possible to avoid a situation where agglomerates which are more or less randomly formed and hence are of various sizes are coated, ie. the coating on the individual particles forming the agglomerates is not coherent and results in magnetically inhomogeneous iron oxides after further treatment is carried out. As a result, additional process steps, such a resuspension, refiltration and rewashing, are required.

It would therefore be desirable to add the coating substances to the reaction mixture before, during or after the preparation of the iron oxide hydroxide. However, the above disadvantages are particularly troublesome here, since the composition and the particle size and shape of the iron oxide hydroxide show a pronounced dependence on the process parameters, eg. temperature and pH, so that these cannot be varied at will. Frequently, organic substances are added during the reaction in order to influence the shape and size of the pigment particles. In these cases, the amounts employed are determined on the basis of the desired particle geometry, and cannot be fixed, for example, with a view to achieving optimum subsequent reduction. However, such a pronounced effect on the crystallization process itself may also be highly undesirable. In any case the tendency of the above compounds to foam is troublesome. Iron oxide hydroxides are prepared in a three-phase reaction (solid/liquid/gas), for which thorough mixing of the components, for example by vigorous stirring and by passing in a gas stream at high velocity, is absolutely necessary. Where the reaction mixture foams, such thorough mixing is not possible, and isolation of the precipitate, eg. by decanting, and washing are made more difficult. Moreover, undesirable flotation phenomena frequently occur during the reaction. Although the hydrophilic component of the substances used hitherto facilitates adduct formation with the iron oxide hydroxide, it also results in salts or ions from the reaction solution being readily included in the coating, with the result that they are then difficult to wash out again.

It is an object of the present invention to provide a process which is free from the above disadvantages and gives acicular ferrimagnetic iron oxides which possess excellent magnetic properties, in particular a high coercive force coupled with a very narrow switching field distribution, and are hence useful for the production of magnetic recording media which have a low noise level.

We have found that this object is achieved, and that, surprisingly, acicular ferrimagnetic iron oxides are obtained, in accordance with the invention, by reducing gamma-iron(III) oxide hydroxide to magnetite, at from 280° to 620° C., by means of an organic compound which is decomposable at this temperature in the presence of iron oxide, and, if desired, then oxidizing the magnetite with oxygen-containing gases, at from 150° to 450° C., to acicular ferrimagnetic iron oxide of the formula $FeO_x$, where x is from above 1.33 to 1.50, if the organic compound used for the reduction is a non-polar glycerol ester of a fatty acid which is introduced into the aqueous reaction suspension during the preparation of the gamma-iron(III) oxide hydroxide.

The acicular gamma-iron(III) oxide hydroxide which is suitable for the novel process, and is referred to as, inter alia, lepidocrocite, is known, as is its preparation. It has been disclosed that it can be prepared, for example, by precipitating iron(II) hydroxide from an iron(II) chloride solution with ammonia at pH 7 and at from 20° to 50° C., and then oxidizing the precipitated hydroxide with air while maintaining the pH (Schwertmann, Zeitschrift für Anorg. Chemie 298 (1959), 337–348). German Pat. No. 1,223,352 discloses another process for the preparation of lepidocrocite, in which nucleation takes place as a result of precipitation from an iron(II) salt solution with an alkali metal base or an alkaline earth metal base and oxidation of the iron(II) hydroxide or carbonate with oxygen, air, an organic nitro compound or another oxidizing agent, and growth of the lepidocrocite seeds in the iron(II) salt solution is effected in the presence of metallic iron or with the simultaneous addition of equivalent amounts of iron(II) ions and a solution or suspension of an alkali or an alkaline earth, or with the simultaneous addition of equivalent amounts of iron(III) ions and a solution or suspension of an alkali metal base or an alkaline earth metal base, the oxidizing agent being used. The lepidocrocite can also be obtained in a similar manner if, in a first stage, a suspension of colloidal lepidocrocite seeds is produced by combining iron(II) chloride with an aqueous alkali, the concentration of the iron(II) chloride being about 29.95–59.9 g per liter, and the resulting mixture is stirred vigorously while an oxygen-containing gas is fed in until the pH of the mixture is from 2.9 to 4.1, after which, in a second stage, the suspension is maintained while stirring vigorously at from 26.7° to 60° C. and at a pH of from 2.9 to 4.1, in the presence of an excess of iron(II) chloride, while an alkali and an oxygen-containing gas are fed in simultaneously and continuously until from 1.2 to 5 parts by weight, per part by weight of the seed, of the total product have been formed.

In accordance with the invention, a non-polar glycerol ester of a fatty acid is then introduced into the aqueous reaction suspension during the preparation of the gamma-iron(III) oxide hydroxide.

Appropriate glycerol esters of fatty acids of 8 to 23 carbon atoms have a solidification point below 20° C. They occur, generally in the form of a mixture, in a number of natural oils, eg. peanut oil, soybean oil, castor oil and olive oil, and are neither water-soluble nor surface-active non polar. They are employed in an amount of from 0.5 to 10, preferably from 0.8 to 5.0, %, based on the iron oxide hydroxide.

The said ester may be added to the reaction suspension at any desired point in time. However, it has proved particularly advantageous to introduce the glycerol ester of the fatty acid into the reaction suspension, at a pH of from 2 to 5, during the growth phase of the gamma-iron(III) oxide hydroxide. After the growth phase is complete, the resulting gamma-iron(III) oxide hydroxide is filtered off, washed with water to remove inorganic salts, and dried. The amount of organic substance which has been absorbed is then from 90 to 95% of the amount introduced.

The gamma-iron(III) oxide hydroxide coated in this manner is then reduced to magnetite by heating at from 280° to 620° C., advantageously in continuous reduction stages with a mean residence time of from 30 to 150 minutes, under a stream of an inert gas, usually nitrogen.

The magnetite obtained by the reduction is, if desired, then oxidized with oxygen-containing gases, advantageously under a stream of air, at from 150° to 450° C., to acicular ferrimagnetic iron oxide of the formula $FeO_x$, where x is from above 1.33 to 1.50. The oxidation is usually allowed to proceed until gamma-iron(III) oxide is obtained (x=1.5).

In developing the novel process, it has been found that the coercive force and the specific surface area of the magnetic end product can be influenced by simultaneously metering in a reducing gas, eg. hydrogen, during the above reduction by means of a decomposable organic substances. By using appropriate mixtures of hydrogen and nitrogen during the reduction step, it is possible to vary the coercive force and the specific surface area within wide limits, as is shown by way of example in the Figure.

When, as the decomposable organic compound which effects reduction to magnetite, a non-polar glycerol ester of a fatty acid is added directly to the reaction suspension in the preparation of the gamma-iron(III) oxide hydroxide in accordance with the novel process, coating of these particles takes place without the process conditions being restricted. The metering is simple and does not require any of the conventional process steps, eg. mixing, absorption from solution, and coating of the particles with an organic compound in the form of a vapor. Furthermore, there is no foaming, as is the case with the conventional additives, eg. sodium stearate, when air is passed through the reaction mixture; foaming gives rise to difficulties when the process is carried out. Although the glycerol esters of the fatty acids are non-polar, they are absorbed onto the particles. Since this takes place during formation of the particles in the suspension, the individual particles are coated. Agglomerates do not have first to be separated mechanically, resulting in possible damage to the acicular shape of the gamma-iron(III) oxide hydroxide particles. A particular advantage of a glycerol ester of a fatty acid is that it is non-polar and hence has no effect on the geometry of the particles during their growth. The uniform coating on all the particles results in the reduction proceeding uniformly.

Compared with the gamma-iron(III) oxides obtainable by conventional conversion processes, the acicular, ferrimagnetic iron oxides prepared according to the invention, in particular the gamma-iron(III) oxide obtainable in this manner, are particularly homogeneous, exhibit good retention of the acicular shape and possess a particularly narrow switching field distribution. They are therefore outstandingly suitable for the production of magnetic recording media which possess a very good maximum output level at long wavelengths and an above-average maximum output level at short wavelengths coupled with a high signal-to-noise ratio and a good signal-to-print-through ratio.

To produce a magnetic layer, the gamma-iron(III) oxide is dispersed in a polymeric binder. Suitable binders for this purpose are known compounds, such as homopolymers and copolymers of vinyl compounds, polyurethanes, polyesters and the like. The binder is used as a solution in a suitable organic solvent which may or may not contain further additives. The magnetic layer is applied to a rigid or flexible base, eg. a disk, a plastics film, or a card.

The Examples which follow illustrate the invention in comparison with comparative experiments based on the prior art.

The specific surface area of the pigment was determined by the BET method, ie. nitrogen was adsorbed onto weighed evacuated gas-free pigment samples. The amount of nitrogen adsorbed is divided by the weight of the sample.

The mean crystallite size in the individual particles was determined by X-ray diffraction. Using a Siemens X-ray goniometer with a counter, the profile of a reflection, eg. the (911) reflection, of a powder sample was measured. From this measurement and a knowledge of the apparatus constants, the mean crystallite size was deduced. For example, iron-filtered cobalt $K\alpha$ radiation is used as the radiation source.

The properties of the magnetic powder were determined on an oxide sample having a tamped density d of 1.2 g/cm$^3$, by means of a conventional vibrating sample magnetometer at 100 kA/cm field strength. The coercive force (Hc) is expressed in [kA/m], and the specific remanence (Mr/$\rho$) and the specific saturation magnetization (Mm/$\rho$) in [nTm$^3$/g].

The magnetic tape samples were also examined at a field strength of 100 kA/m by means of a vibrating sample magnetometer. The coercive force Hc, the residual induction Mr in [mT] and the orientation ratio, ie. the ratio of the residual induction in the direction of particle orientation to that in the crosswise direction, are specified. The maximum output levels at long wavelengths and short wavelengths were measured according to DIN 45,512, Part II, against IEC reference tape 1. The reference level-to-weighted noise ratio RGA is expressed relative to IEC reference tape 1, the RGA ratio of which is taken to be 0 dB.

The switching field distribution becomes narrower with increasing orientation of the particles in the magnetic field, ie. with increasing squareness S=Mr/Mm, and the field required to switch 50% of the particles, ie. the remanence coercivity Hr, becomes smaller.

S has to be measured using a saturation field which is not less than 10 times the coercive force. In the Examples, the measurement was carried out at $8 \times 10^5$ A/m. The lower the measured $h_{25}$ value, the narrower the switching field distribution of the sample measured.

EXAMPLE 1

17.2 m$^3$ of 8.5% strength iron(II) chloride solution were initially introduced into a stirred vessel having a capacity of 30 m$^3$, and 3.20 m$^3$ of 15% strength sodium hydroxide solution were added, while stirring at 24° C., to produce a precipitate from 55% of this solution. When the pH was monitored after precipitation, it was found to be 6.4–7.2. 1,650 m$^3$/hour of air were then injected into the stirred mixture at this temperature, and, after the passage of air had been continued for 3.5 hours, the pH of the suspension had decreased. At pH 3, the suspension was heated to 33° C., and a further amount of 15% strength sodium hydroxide solution was then fed in. The latter operation was coupled with the pH measurement, the pH being set at 4.6±0.2. After the temperature had been increased to 33° C., 2,200 m$^3$/hour of air were passed in at pH 4.6±0.2 for one hour, after which 25 kg of a glycerol ester mixture having an iodine number of 90, a solidification point of +6° C. and a chain length of 14 to 18 carbon atoms were added to the suspension. After the passage of air had been continued for a further 3 hours, the oxidation rate was only 2% of that at the beginning of the growth phase. The reaction was then discontinued, and the suspension was washed chloride-free in a conventional filtration apparatus, using fully demineralized water, until the product contained 0.1% of Cl, based on dry $\gamma$-iron oxide hydroxide.

The granulated filter residue was dried at 150° C. in a conventional cabinet dryer. The specific surface area determined by the BET method was 28.5 m$^2$/g; the pigment contained 1.9% of carbon, and the average length of the acicular particles was 0.5 $\mu$m, the length/width ratio being 14:1.

The product was then conveyed continuously, at a rate of 78 kg per hour, through a rotary tubular furnace subdivided into 4 heating zones. At the same time, a gas mixture, heated to 500° C. and comprising 11 m³ of hydrogen and 9 m³ of nitrogen, was passed in together with the solid. The internal temperatures of the 4 successive heating zones were 350°, 440°, 540° and 550° C. respectively. After a residence time of 40 minutes, the magnetite dropped, via a discharge gate flushed with nitrogen, into a second rotary tubular furnace, in which it was oxidized by means of a stream of air to γ-iron(III) oxide, the internal temperature being 260° C. and the mean residence time being 30 minutes. The results of the measurements on the product are shown in Table 1.

EXAMPLE 2

The procedure described in Example 1 was followed, except that, instead of 11 m³/hour of hydrogen and 9 m³/hour of nitrogen, 20 m³/hour of hydrogen were fed into the reduction furnace. The results of the measurements are shown in Table 1.

EXAMPLE 3

The procedure described in Example 1 was followed, except that, instead of 11 m³/hour of hydrogen and 9 m³/hour of nitrogen, 20 m³/nitrogen were fed into the reduction furnace. The results of the measurements are shown in Table 1.

EXAMPLE 4

The procedure described in Example 1 was followed, except that the ester added during the preparation of γ-FeOOH was glycerol palmitate having an iodine number of 50, this ester being employed in the same amount. The results of the measurements are shown in Table 1.

EXAMPLE 5

The procedure described in Example 1 was followed, except that the amount of ester mixture added during the preparation of γ-FeOOH was 32 kg. The results of the measurements are shown in Table 1.

EXAMPLE 6

The procedure described in Example 1 was followed, except that the internal temperatures of the successive zones of the reduction furnace were 320°, 420°, 490° and 530° C. respectively. The results of the measurements are shown in Table 1.

COMPARATIVE EXPERIMENT 1

The procedure described in Example 1 was followed, except that the glycerol ester mixture was not added until the end of the growth phase. The mixture was stirred for one hour in the absence of air and was then filtered, the further procedure being as described in Example 1. The results of the measurements are shown in Table 1.

COMPARATIVE EXPERIMENT 2

The procedure described in Example 1 was followed, except that the organic compound added to the γ-FeOOH suspension was tricresyl phosphate. The results of the measurements are shown in Table 1.

COMPARATIVE EXPERIMENT 3

The procedure described in Example 1 was followed, except that the organic compound added to the γ-FeOOH suspension was soybean lecithin. The results of the measurements are shown in Table 1.

COMPARATIVE EXPERIMENT 4

The procedure described in Example 1 was followed, except that the organic compound added to the γ-FeOOH suspension was stearic acid having a yield point of 55° C. After filtration and drying, analysis showed that the residual amount of chloride ions was 0.6%, although the wash water was chloride-free before the end of the filtration. The results of the measurements are shown in Table 1.

COMPARATIVE EXPERIMENT 5

γ-FeOOH was prepared as described in Example 1, except that an organic substance was not added. The lepidocrocite was filtered off, washed and dried, and the granulated pigment was converted into a suspension in a stirred kettle of 30 m³ capacity. Thereafter, 25 kg of the glycerol ester mixture described in Example 1 were added, and the suspension was heated at 35° C. and stirred for a further 5 hours. The resulting suspension was then filtered, and the filter residue was dried at 150° C. The other conditions were as described in Example 1. The results of the measurements are shown in Table 1.

COMPARATIVE EXPERIMENT 6

γ-FeOOH was prepared as described in Example 1, except that the ester mixture was not added. The product was fed into the reduction furnace at the same rate as in Example 1, the average residence time and the gas mixture employed likewise being as described in Example 1, and the ester mixture was injected continuously in an amount of 2.5%, based on the product fed in. The other conditions were as described in Example 1. The results of the measurements are shown in Table 1.

COMPARATIVE EXPERIMENT 7

γ-FeOOH was prepared as described in Example 1, except that the ester mixture was not added. As the product was fed into the reduction furnace, stearic acid was metered continuously into the product feed tube upstream of the conveying screw, in an amount of 2.5%, based on the product fed in. The other conditions were as described in Example 1. The results of the measurements are shown in Table 1.

COMPARATIVE EXPERIMENT 8

γ-FeOOH was prepared as described in Example 1, except that the ester mixture was not added. 78 kg/hour of the product was fed into the reduction furnace, together with a stream of 30 m³/hour of nitrogen which had previously been passed through a vessel filled with stearic acid heated to 270° C. The other conditions were as described in Example 1. The results of the measurements are shown in Table 1.

EXAMPLE 7

A solution of 358 g of $FeCl_2.4H_2O$ in 2 liters of water was introduced into a 5 liter glass apparatus, and 1 liter of 1.8N NaOH was added dropwise to the vigorously stirred solution in the course of 10 minutes in a stream of nitrogen. After a further 10 minutes, the gas stream was replaced by 200 liters/hour of air. As soon as the pH had dropped below 4, it was brought to 5–6 by dropwise addition of 1.8N NaOH and kept at this value, the passage of air being continued. The reaction was complete as soon as the pH remained constant without it being necessary to add sodium hydroxide solution. This was the case after 1,050 ml of the latter had been added.

dicyanatodiphenylmethane and having a K value of 61 (measured as a 1% strength solution in tetrahydrofuran)

TABLE 1

|  | BET specific surface area | Crystallite size | Hc [kA/m] | Mr/ [nTm³/g] | Mm/ [nTm³/g] | % C in FeOOH | % C in γ-Fe₂O₃ |
|---|---|---|---|---|---|---|---|
| Example | | | | | | | |
| 1 | 22.5 | 220 | 26.7 | 38 | 81 | 1.9 | 0.55 |
| 2 | 20.1 | 260 | 28.2 | 39 | 82 | 1.9 | 0.50 |
| 3 | 28.0 | 235 | 22.5 | 38 | 81 | 1.9 | 0.61 |
| 4 | 21.9 | 240 | 27.0 | 38.5 | 82 | 2.4 | 0.68 |
| 5 | 23.1 | 222 | 25.9 | 38 | 82 | 1.9 | 0.58 |
| 6 | 23.8 | 210 | 24.8 | 39 | 83 | 1.9 | 0.60 |
| Comparative Experiment | | | | | | | |
| 1 | 21.3 | 250 | 25.4 | 38 | 81 | 1.8 | 0.55 |
| 2 | 18.9 | 290 | 27.2 | 38 | 80 | 1.5 | 0.35 |
| 3 | 19.5 | 285 | 26.8 | 37.5 | 79 | 1.7 | 0.42 |
| 4 | 17.8 | 270 | 27.8 | 38.5 | 81 | 1.9 | 0.51 |
| 5 | 19.8 | 295 | 27.3 | 39 | 82.5 | 1.4 | 0.30 |
| 6 | 20.3 | 300 | 26.9 | 38 | 80 | — | 0.38 |
| 7 | 20.5 | 280 | 26.8 | 38.5 | 83 | — | 0.40 |
| 8 | 18.2 | 340 | 29.2 | 40.5 | 84 | — | 0.27 |

At this stage, 6.4 ml of an oil (cf. Table 2) were added, and the mixture was stirred for a further half an hour. The precipitate was then filtered off under suction, washed twice, and dried at 80° C. in a vacuum shelf dryer.

For conversion to γ-Fe₂O₃, the product was heated for 30 minutes in a 500 ml spherical rotary quartz kiln in a stream of 5 liters/hour of N₂ at 520° C., and was then oxidized for 30 minutes at 350° C. in a stream of 100 liters/hour of air. The results of the measurements are shown in Table 2.

EXAMPLES A–O

The magnetic materials of Examples 1 to 6 and of Comparative Experiments 1 to 8 were processed in the following manner into magnetic dispersions which were used to manufacture magnetic tapes:

9,000 parts (by weight here and hereinafter) of steel balls, 900 parts of the magnetic material, 22.5 parts of a long-chain amphoteric organophilic dispersant, 4.5 parts of a silicone oil, 4.5 parts of a mixture of isomeric carboxylic acids with a yield point of <5° C., 126 parts of a commercial isocyanate-free polyester-urethane obtained from adipic acid, butane-1,4-diol and 4,4'- and 54 parts of a PVC/ethyl maleate copolymer having a K value of 59 (likewise measured as 1% strength solution in tetrahydrofuran), and 2,200 parts of a mixture of equal parts of tetrahydrofuran and 1,4-dioxane were introduced into a steel ball mill which had a capacity of 6,000 parts by volume and was run at 72 r.p.m., the binders being introduced in the form of a solution in the solvent mixture mentioned.

TABLE 2

| Experiment | Oil used | $S_{N_2}$ [m²/g] | $H_c$ [kA/m] | $M_m/\rho$ [nTm³/g] | $M_r/\rho$ [nTm³/g] |
|---|---|---|---|---|---|
| a | olive oil | 27.6 | 23.6 | 74 | 38 |
| b | peanut oil | 26.7 | 23.5 | 78 | 40 |
| c | soybean oil | 21.4 | 23.9 | 77 | 40 |

The entire mixture was milled for 80 hours at 35° C. The magnetic dispersion obtained was filtered, after which it was cast, by means of a conventional coater, onto a 12 μm thick polyethylene terephthalate film, the amount applied being such that, after drying in a tunnel dryer and then calendering on a multi-roll calender (to give an average peak-to-valley height of 0.10 μm, measured using an apparatus manufactured by Perthen, Hanover, Germany), a 4.1 μm thick magnetic coating was obtained. In the zone of the tunnel dryer where the coating was still wet, a magnet extending over the entire width of the coating oriented the magnetic particles in the desired direction. The coated webs thus obtained were slit into 3.81 mm wide magnetic tapes.

The results of the measurements on the individual magnetic tapes are listed in Table 3.

TABLE 3

| Example | Material | Hc [kA/m] | Mr [mT] | Orientation ratio | Maximum output level at 1 kHz [dB] | Maximum output level at 10 kHz [dB] | RGA ratio [dB] | Switching field distribution h₂₅ (field strength = 800 kA/m) |
|---|---|---|---|---|---|---|---|---|
| A | Example 1 | 26.3 | 170 | 3.3 | +1.0 | +1.5 | −0.5 | 0.26 |
| B | Example 2 | 27.2 | 168 | 3.2 | +0.8 | +1.9 | −0.8 | 0.26 |
| C | Example 3 | 22.5 | 162 | 3.1 | +1.5 | +0.2 | 0 | 0.26 |
| D | Example 4 | 26.2 | 172 | 3.4 | +1.1 | +1.6 | −0.4 | 0.27 |
| E | Example 5 | 25.2 | 175 | 3.3 | +1.0 | +1.2 | −0.2 | 0.26 |
| F | Example 6 | 24.1 | 177 | 3.2 | +1.4 | +0.6 | 0 | 0.27 |
| G | Comparative Experiment 1 | 25.9 | 165 | 2.9 | +0.7 | +0.3 | −0.9 | 0.29 |
| H | Comparative Experiment 2 | 26.0 | 155 | 2.8 | +0.8 | 0 | −1.0 | 0.30 |
| J | Comparative Experiment 3 | 25.9 | 150 | 2.7 | +0.7 | +0.3 | −0.5 | 0.31 |
| K | Comparative Experiment 4 | 26.7 | 145 | 2.4 | +0.3 | −0.5 | −1.5 | 0.33 |
| L | Comparative Experiment 5 | 26.0 | 152 | 2.6 | +0.5 | +0.2 | −0.5 | 0.31 |

TABLE 3-continued

| Example | Material | Hc [kA/m] | Mr [mT] | Orientation ratio | Maximum output level at 1 kHz [dB] | Maximum output level at 10 kHz [dB] | RGA ratio [dB] | Switching field distribution $h_{25}$ (field strength = 800 kA/m) |
|---|---|---|---|---|---|---|---|---|
| M | Comparative Experiment 6 | 25.8 | 155 | 2.7 | +0.5 | +0.5 | −0.8 | 0.31 |
| N | Comparative Experiment 7 | 25.7 | 153 | 2.7 | +0.6 | +0.3 | −0.7 | 0.32 |
| O | Comparative Experiment 8 | 28.0 | 148 | 2.3 | −0.5 | +1.8 | −1.8 | 0.34 |

We claim:

1. A process for the preparation of an acicular ferrimagnetic iron oxide by reducing gamma-iron(III) oxide hydroxide to magnetite, at from 280° to 620° C., by means of an organic compound which is decomposable at this temperature in the presence of iron oxide, and, optionally, then oxidizing the magnetite with oxygen-containing gases, at from 150° to 450° C., to acicular ferrimagnetic iron oxide of the formula $FeO_x$, where x is from about 1.33 to 1.50, wherein the gamma-iron (III) oxide hydroxide is prepared in an aqueous reaction suspension by precipitation and oxidation of an aqueous iron (II) solution and wherein the organic compound used for the reduction is a non-polar glycerol ester of a fatty acid which is introduced into the aqueous reaction suspension during the preparation and growth of the gamma-iron(III) oxide hydroxide; the acicular ferrimagnetic iron oxide so prepared when incorporated into a tape effecting a magnetic tape having a narrower switching field distribution than a magnetic tape containing said acicular ferrimagnetic iron oxide prepared as above but where said organic compound is added at the end of the preparation and growth of the gamma-iron (III) oxide hydroxide.

2. A process for the preparation of an acicular ferrimagnetic iron oxide by reducing gamma-iron(III) oxide hydroxide to magnetite, at from 280° to 620° C., by means of an organic compound which is decomposable at this temperature in the presence of iron oxide, under a stream of a reducing gas and/or an inert gas, and, optionally, then oxidizing the magnetite with oxygen-containing gases, at from 150° to 450° C., to acicular ferrimagnetic iron oxide of the formula $FeO_x$, where x is from above 1.33 to 1.50, wherein the gamma-iron (III) oxide hydroxide is prepared in an aqueous reaction suspension by precipitation and oxidation of an aqueous iron (II) solution and wherein the organic compound used for the reduction is a non-polar glycerol ester of a fatty acid which is introduced into the aqueous reaction suspension during the preparation and growth of the gamma-iron(III) oxide hydroxide; the acicular ferrimagnetic iron oxide so prepared when incorporated into a tape effecting a magnetic tape having a narrower switching field distribution than a magnetic tape containing said acicular ferrimagnetic iron oxide prepared as above but where said organic compound is added at the end of the preparation and growth of the gamma-iron (III) oxide hydroxide.

* * * * *